United States Patent
Mallis et al.

(10) Patent No.: US 8,668,233 B2
(45) Date of Patent: Mar. 11, 2014

(54) THREADED CONNECTION WITH PERTURBED FLANKS

(75) Inventors: David Llewellyn Mallis, The Woodlands, TX (US); Harris A. Reynolds, Jr., Houston, TX (US)

(73) Assignee: Hydril Company, Houston, TX (US)

( * ) Notice: Subject to any disclaimer, the term of this patent is extended or adjusted under 35 U.S.C. 154(b) by 1389 days.

(21) Appl. No.: 11/614,655

(22) Filed: Dec. 21, 2006

(65) Prior Publication Data

US 2007/0158943 A1 Jul. 12, 2007

Related U.S. Application Data

(63) Continuation-in-part of application No. 11/027,014, filed on Dec. 30, 2004, now Pat. No. 7,458,616.

(51) Int. Cl.
*F16L 15/00* (2006.01)

(52) U.S. Cl.
USPC .......................... 285/390; 285/333

(58) Field of Classification Search
USPC .................. 285/333, 334, 355, 390
See application file for complete search history.

(56) References Cited

U.S. PATENT DOCUMENTS

| | | | | |
|---|---|---|---|---|
| 597,000 | A * | 1/1898 | Higbee | 285/333 |
| 2,177,100 | A * | 10/1939 | Frame | 285/334 |
| 2,239,942 | A | 4/1941 | Stone et al. | |
| 2,788,046 | A | 4/1957 | Rosan | |
| 2,827,313 | A * | 3/1958 | Conner | 285/355 |
| 2,992,019 | A | 7/1961 | MacArthur | |
| 3,359,013 | A | 12/1967 | Knox et al. | |
| 4,161,332 | A | 7/1979 | Blose | |
| RE30,647 | E | 6/1981 | Blose | |
| 4,346,920 | A | 8/1982 | Dailey | |
| 4,570,982 | A | 2/1986 | Blose et al. | |
| 4,582,348 | A | 4/1986 | Dearden | |
| 4,600,225 | A | 7/1986 | Blose | |
| 4,662,659 | A | 5/1987 | Blose | |

(Continued)

FOREIGN PATENT DOCUMENTS

| | | |
|---|---|---|
| GB | 1421272 | 1/1976 |
| JP | 2004-524483 | 8/2004 |
| WO | 02/065012 A1 | 8/2002 |

OTHER PUBLICATIONS

Office Action in corresponding U.S. Appl. No. 11/752,646 dated Jun. 23, 2009. 20 pages.

(Continued)

*Primary Examiner* — Aaron Dunwoody
(74) *Attorney, Agent, or Firm* — Osha Liang LLP (57) ABSTRACT

A threaded connection including a pin member and a box member, and methods for manufacturing and forming said threaded connection. The pin member has a pin thread with a pin thread crest, a pin thread root, a pin load flank, and a pin stab flank. The box member has a box thread with a box thread crest, a box thread root, a box load flank, and a box stab flank. At least one of the pin thread crest, the pin load flank, the pin stab flank, the box thread crest, the box load flank, and the box stab flank has at least one perturbation formed thereon. Upon a selected make-up of the pin member with the box member, a reduced clearance gap exists between the pin thread and the box thread at the at least one perturbation.

11 Claims, 8 Drawing Sheets

(56) References Cited

U.S. PATENT DOCUMENTS

| | | | |
|---|---|---|---|
| 4,688,832 A * | 8/1987 | Ortloff et al. | 285/148.19 |
| 4,703,954 A | 11/1987 | Ortloff | |
| 4,730,587 A | 3/1988 | Norota et al. | |
| 4,753,460 A | 6/1988 | Tung | |
| 4,917,409 A | 4/1990 | Reeves | |
| 5,221,113 A | 6/1993 | Stoll et al. | |
| RE34,467 E | 12/1993 | Reeves | |
| 5,360,239 A | 11/1994 | Klementich | |
| 5,454,605 A | 10/1995 | Mott | |
| 5,462,315 A | 10/1995 | Klementich | |
| 6,050,610 A | 4/2000 | Enderle | |
| 6,123,364 A | 9/2000 | Inoue et al. | |
| 6,174,001 B1 | 1/2001 | Enderle | |
| 6,206,436 B1 | 3/2001 | Mallis | |
| 6,254,146 B1 * | 7/2001 | Church | 285/334 |
| 6,270,127 B1 | 8/2001 | Enderle | |
| 6,412,831 B1 | 7/2002 | Noel et al. | |
| 6,578,880 B2 | 6/2003 | Watts | |
| 6,682,101 B2 | 1/2004 | Watts | |
| 6,722,706 B2 * | 4/2004 | Church | 285/334 |
| 6,905,149 B2 * | 6/2005 | DeLange et al. | 285/334 |
| 6,976,711 B2 | 12/2005 | Sivley, IV | |
| 7,017,950 B2 | 3/2006 | Macaulay | |
| 7,243,957 B2 | 7/2007 | Reynolds, Jr. | |
| 7,458,616 B2 | 12/2008 | Reynolds, Jr. | |
| 7,469,938 B2 * | 12/2008 | Sivley, IV | 285/390 |
| 7,549,682 B2 * | 6/2009 | Pallini et al. | 285/390 |
| 7,578,043 B2 * | 8/2009 | Simpson et al. | 29/522.1 |
| 2003/0067169 A1 * | 4/2003 | Church | 285/334 |
| 2004/0017081 A1 * | 1/2004 | Simpson et al. | 285/333 |
| 2004/0195835 A1 * | 10/2004 | Noel et al. | 285/333 |
| 2007/0035131 A1 * | 2/2007 | Benzie | 285/333 |
| 2007/0063517 A1 * | 3/2007 | Pallini et al. | 285/390 |
| 2007/0236014 A1 * | 10/2007 | Reynolds et al. | 285/334 |
| 2008/0007060 A1 * | 1/2008 | Simpson et al. | 285/334 |
| 2008/0012321 A1 * | 1/2008 | Roussie | 285/334 |
| 2008/0042431 A1 * | 2/2008 | Steely | 285/93 |
| 2008/0073909 A1 * | 3/2008 | Church | 285/334 |
| 2008/0277933 A1 * | 11/2008 | Church | 285/334 |
| 2009/0058085 A1 * | 3/2009 | Breihan et al. | 285/334 |
| 2009/0250927 A1 * | 10/2009 | Pallini et al. | 285/334.2 |

OTHER PUBLICATIONS

International Preliminary Search Report on Patentability in Corresponding PCT application PCT/US2007/088364 dated Jul. 2, 2009.

Office Action dated May 15, 2008 issued in U.S. Appl. No. 11/775,682, 7 pages.

Office Action dated Jun. 2, 2008 issued in U.S. Appl. 11/424,783, 18 pages.

Notice of Allowance dated Aug. 11, 2008, issued by the USPTO in CIP U.S. Appl. No. 11/027,014, 12 pages.

International Search Report and Written Opinion dated Oct. 24, 2007, issued in PCT/US2007/069574, 11 pages.

U.S. Office Action dated Jan. 9, 2008 issued in corresponding U.S. Appl. No. 11/027,014, 8 pages.

International Search Report & Written Opinion issued in corresponding PCT Application No. PCT/US2005/046874; Dated May 25, 2007; 15 pages.

Office action dated Jan. 31, 2007 for corresponding U.S. Appl. No. 11/027,014 (11 pages).

Office action dated Dec. 8, 2010, in corresponding U.S. Appl. No. 11/678,201. (24 pages).

Notice of Allowance issued in related U.S. Appl. No. 12/721,410; Dated Feb. 24, 2011 (5 pages).

Notice of Allowance in a related U.S. Appl. No. 11/752,646; dated Mar. 10, 2010 (7 pages).

Notice of Allowance issued in related U.S. Appl. No. 11/678,501; dated Jun. 14, 2010 (10 pages).

Notice of Allowance issued in related U.S. Appl. No. 11/752,646; dated Jun. 14, 2010 (6 pages).

Notice of Allowance issued in related U.S. Appl. No. 11/678,501; dated Jul. 6, 2010 (6 pages).

Notice of Allowance issued in related U.S. Appl. No. 11/752,646; dated Jul. 13, 2010 (7 pages).

Office Action issued in related U.S. Appl. No. 12/721,410; dated Jun. 21, 2010 (7 pages).

Office Action issued in related U.S. Appl. No. 12/721,410; dated Dec. 8, 2010 (12 pages).

* cited by examiner

Axial Position
*FIG. 5A*

Axial Position
*FIG. 6A*

*FIG. 6B*

Axial Position
*FIG. 7A*

THREADED CONNECTION WITH PERTURBED FLANKS

CROSS-REFERENCE TO RELATED APPLICATIONS

The present application is a continuation in part of U.S. patent application Ser. No. 11/027,014, filed on Dec. 30, 2004, which is hereby incorporated by reference.

BACKGROUND OF INVENTION

1. Field of the Invention

Embodiments disclosed herein relate to threads for tubulars. More specifically, embodiments relate to threads having a reduced clearance gap between portions of the pin thread and the box thread.

2. Background

Casing joints, liners, drill pipe, and drill collars (collectively referred to as "tubulars") are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art. In some connections, seals are formed between the internal and external threads. Connections with this characteristic are said to have a "thread seal." As used herein, a "thread seal" means that a seal is formed between at least a portion of the internal thread on the box member and the external thread on the pin member.

It will be understood that certain terms are used herein as they would be conventionally understood where tubular joints are being connected in a vertical position along a central axis of the tubular members such as when making up a pipe string for lowering into a well bore. Thus, the term "load flank" designates the side wall surface of a thread that faces away from the outer end of the respective pin or box member on which the thread is formed and supports the weight (i.e., tensile load) of the lower tubular member hanging in the well bore. The term "stab flank" designates the side wall surface of the thread that faces toward the outer end of the respective pin or box member and supports forces compressing the joints toward each other such as the weight of the upper tubular member during the initial makeup of the joint or such as a force applied to push a lower tubular member against the bottom of a bore hole (i.e., compressive force). The term "face" of the box is the end of the box member facing outward from the box threads and the term "nose" of the pin is the end of the pin member facing outward from the threads of the connection. Upon makeup of a connection the nose of the pin is stabbed into and past the face of the box.

Figures 1A, 1B:
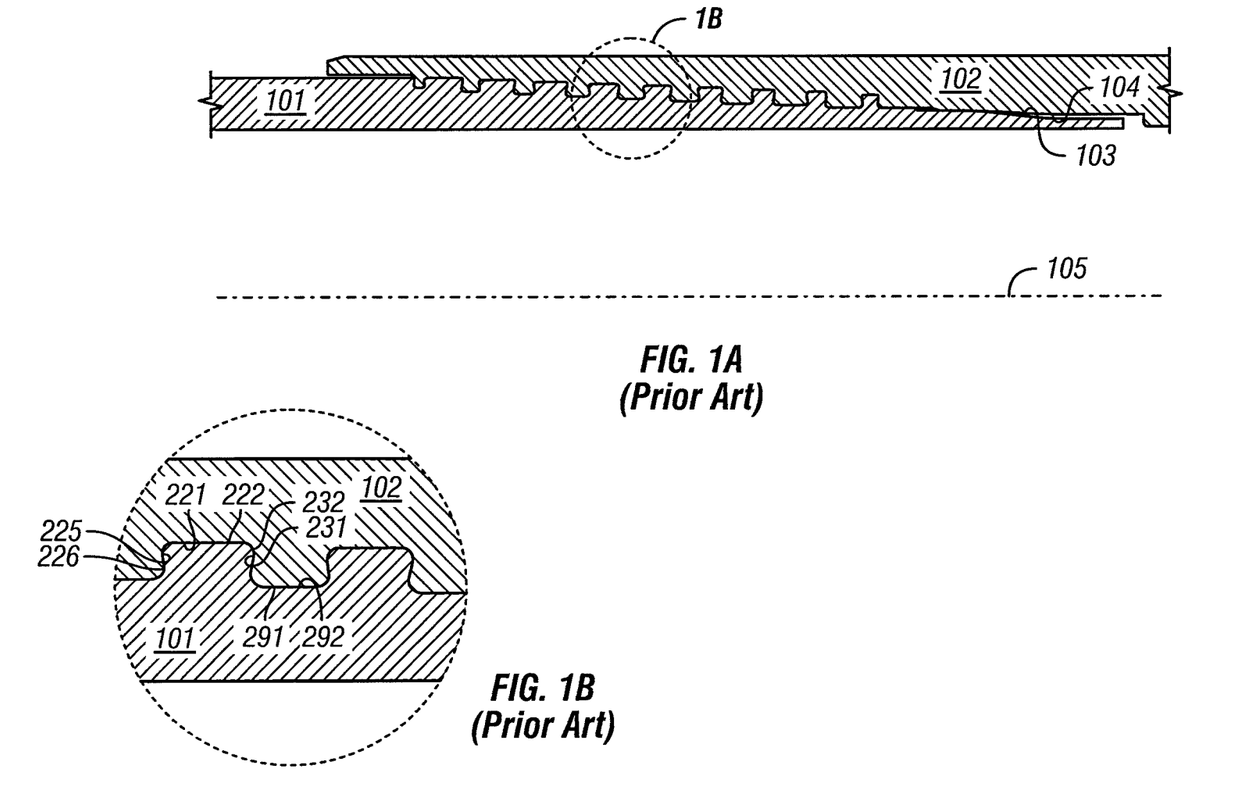
FIG. 1 shows a cross section of a prior art connection having a wedge thread.

One type of thread commonly used to form a thread seal is a wedge thread. In FIG. 1, a connection having a wedge thread is shown. "Wedge threads" are characterized by threads that increase in width (i.e., axial distance between load flanks 225 and 226 and stab flanks 232 and 231) in opposite directions on the pin member 101 and box member 102. Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. On the pin member 101, the pin thread crest 222 is narrow towards the distal end of the pin member 101 while the box thread crest 291 is wide. Moving along the axis 105 (from right to left), the pin thread crest 222 widens while the box thread crest 291 narrows.

Generally, thread seals are difficult to achieve with free-running threads having broad crests and roots, however, the same thread forms may have thread seals when used for wedge threads. Various thread forms may be used for embodiments disclosed below. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. An open thread form with a generally rectangular shape is disclosed in U.S. Pat. No. 6,578,880 issued to Watts. Each of the above thread forms are example thread forms that may be used for embodiments having either wedge threads or free running threads. Those having ordinary skill in the art will appreciate that the teachings contained herein are not limited to particular thread forms.

For wedge threads, a thread seal is accomplished by the contact pressure caused by interference over at least a portion of the connection between the pin load flank 226 and the box load flank 225 and between the pin stab flank 232 and the box stab flank 231, which occurs when the connection is made-up. Close proximity or interference between the roots 292, 221 and crests 222, 291, respectfully, completes the thread seal when it occurs over at least a portion of where the flank interference occurs. Higher pressure may be contained with increased interference between the roots and crests ("root/crest interference") on the pin member 101 and the box member 102 and by increasing flank interference. This particular connection also includes a metal-to-metal seal that is accomplished by contact between corresponding sealing surfaces 103 and 104 located on the pin member 101 and box member 102, respectively.

A property of wedge threads, which typically do not have a positive stop torque shoulder on the connection, is that the make-up is "indeterminate," and, as a result, the relative position of the pin member and box member varies more for a given torque range to be applied than connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference increases) during make-up. Indeterminate make-up allows for the flank interference and root/crest interference to be increased by increasing the torque on the connection. Thus, a wedge thread may be able to thread seal higher pressures of gas and/or liquid by designing the connection to have more flank interference and/or root/crest interference or by increasing the torque on the connection, however, this also increases stress on the connection during make-up, which could lead to failure during use.

Figure 2:
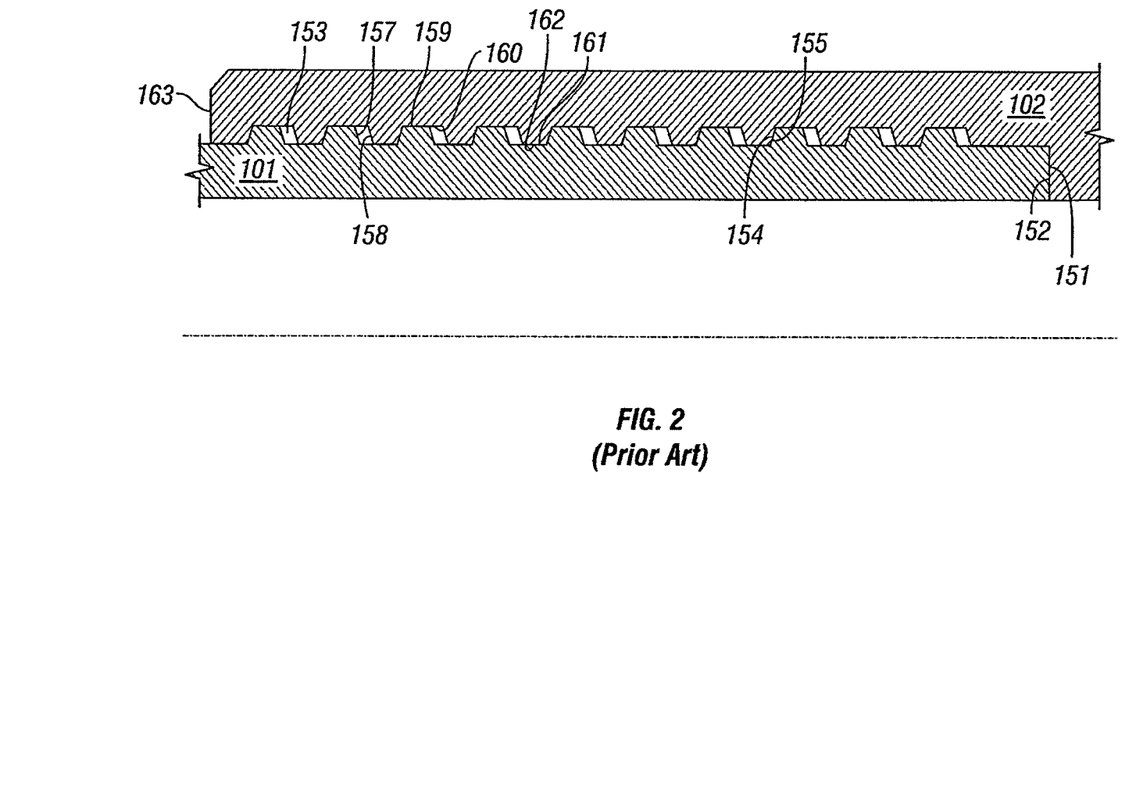
FIG. 2 shows a cross section of a prior art connection having a free-running thread.

Free-running threads used for oilfield tubular connections typically do not form thread seals when the connection is made-up. FIG. 2 shows a prior art connection having free-running threads. The free-running threads include load flanks 154 and 155, stab flanks 157 and 158, crests 159 and 162, and roots 160 and 161. As is typical of a connection with free-running threads, this connection relies on a positive stop torque shoulder formed by the contact of surfaces 151 and 152 disposed on the pin member 101 and the box member 102, respectively. The positive stop torque shoulder shown in FIG. 2 is commonly referred to as a "pin nose shoulder." In other connections, the positive stop torque shoulder may instead be formed by the box face 163 and a mating shoulder (not shown) on the pin member 101. The positive stop torque shoulder may provide a seal. Unlike wedge threads, which make-up by the wedging of the pin thread and the box thread, free-running threads rely on the positive stop torque shoulder to load the connection during make-up. To make-up the connection shown in FIG. 2, the pin member 101 and the box member 102 are screwed together until the surfaces 151 and 152 are brought into abutment, at which point the pin load flank 154 and box load flank 155 are also in abutment. Additional torque is applied to the pin member 101 and the box member 102 to load the surfaces 151 and 152 and the pin load flank 154 and box load flank 155 until the desired amount of make-up torque has been applied to the connection.

The connection shown in FIG. 2 does not accomplish a thread seal because of the large gap 153 that exists between the pin stab flank 157 and box stab flank 158. The gap 153 occurs because of how free-running threads with positive stop torque shoulders are loaded. Applying torque to the connection during make-up against the positive stop torque shoulder causes the pin member 101 to be compressed while the box member 102 is stretched in tension. Note that when a box face shoulder is used, the box member 102 is compressed while the pin member 101 is stretched in tension. The force between the pin member 101 and the box member 102 is applied through the pin load flank 154 and box load flank 155. The pin stab flank 157 and the box stab flank 158 are not loaded during make-up. This results in contact pressure between the load flanks 154 and 155 and a gap between stab flanks 157 and 158. As discussed above, a wedge thread (as shown in FIG. 1) is able to form a thread seal in part because of the interference between the load flanks 225 and 226 and the stab flanks 232 and 231. For wedge threads, this occurs near the end of the make-up of the connection because of the varying width of the pin thread and the box thread. To have similar interference between the load flanks 154 and 155 and stab flanks 157 and 158 on a cylindrical (i.e. non-tapered) free-running thread, the interference would exist substantially throughout the make-up of the connection because the pin thread and the box thread have a continuous width. Further, root/crest interference, if any, would exist substantially throughout the make-up of the connection. This could lead to galling of the threads and difficulty in making up the connection.

Figure 3A:
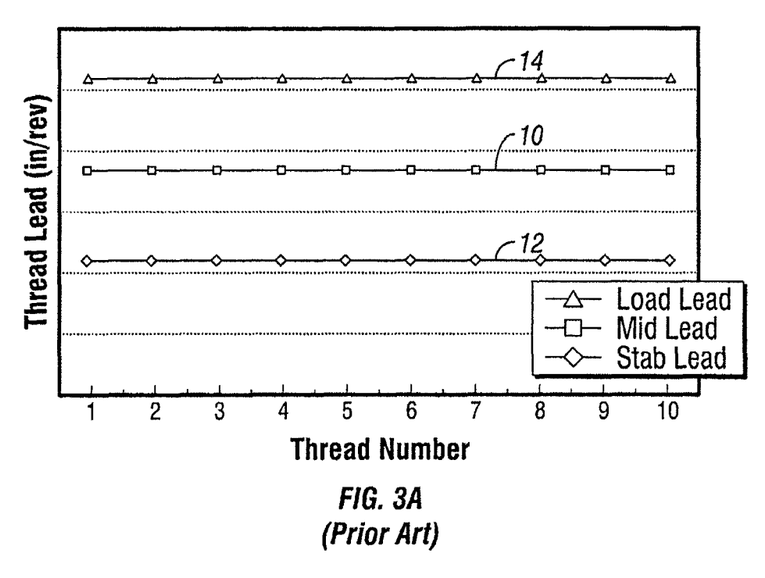
FIGS. 3A, 3B, and 3C show graphs of thread leads for prior art connections.

The variance in thread width for a wedge thread occurs as a result of the load flanks having different leads than the stab flanks. A thread lead may be quantified in inches per revolution. Note that this is the inverse of a commonly used term "thread pitch," which is commonly quantified as threads per inch. A graph of the leads for a prior art wedge thread is shown in FIG. 3A. For this connection, the load lead 14 is constant over the length of the connection and greater than the stab lead 12, which is also constant. The nominal lead is shown as item 10. As used herein, "nominal lead" refers to the average of the load lead 14 and the stab lead 12. The thread will widen with each revolution by the difference in the load lead 14 and the stab lead 12. The difference in the load lead 14 and the stab lead 12 is sometimes referred to as the "wedge ratio." For a free-running thread (i.e. non-wedge thread), the load lead 14 and the stab lead 12 would be substantially equal causing the free-running thread to have a substantially constant thread width (i.e. a zero wedge ratio).

Generally, a thread is cut on a tubular using a substantially constant thread lead (including the load lead and the stab lead), however, some variance in the thread lead occurs during the manufacturing process, which typically includes machining with a mill or lathe. During machining, the variance in the thread lead manifests as a slight periodic variation in the thread lead above and below the intended value for the thread lead. This phenomenon is commonly referred to as "thread drunkenness." The amount of thread drunkenness that occurs is largely dependent on the machine being used. It may be caused by slop or backlash in the machine tool that is cutting the thread. The material being machined and the dimensions of the part being machined are also variables that affect the amount of thread drunkenness. Thread drunkenness can also occur as a result of the electronic controls "hunting" the location for the machine tool. Typically, thread drunkenness is on the order of 0.00005 inch to 0.0005 inch from nominal and is not visible to the eye. The period of the thread drunkenness is typically at least once per thread turn. Greater than normal thread drunkenness is visible as "chatter" on the thread surface and may result in the connection being scrapped. Generally, manufacturers try to eliminate any variations from nominal, such as experienced with thread drunkenness.

Figure 3B:
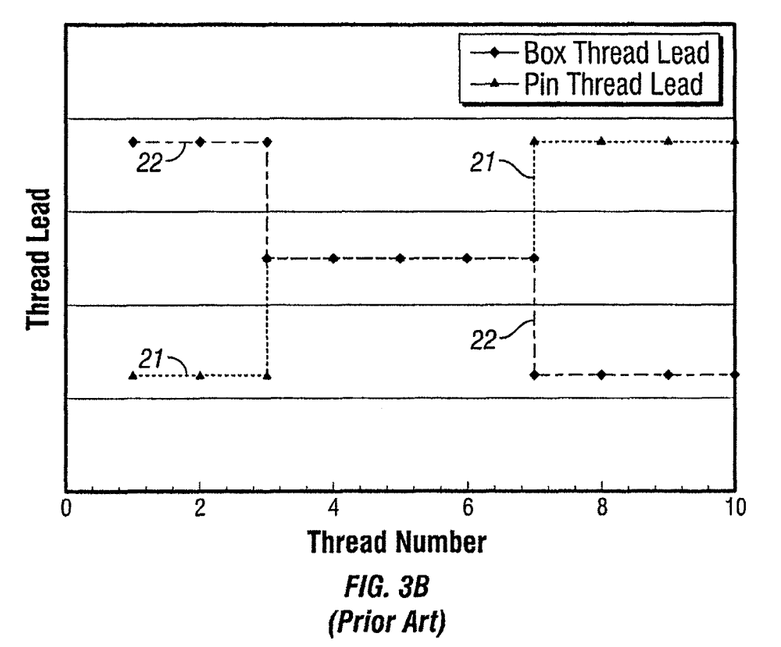

Intentional variances in thread leads have been disclosed in the prior art for the purposes of load distribution, however, the present inventor is unaware of variances in thread leads to form a thread seal for a wedge thread or a free-running thread. One example of a varied thread lead for stress distribution is disclosed in U.S. Pat. No. 4,582,348 issued to Dearden, et al., incorporated herein by reference in its entirety. Dearden discloses a connection with free-running threads that has the pin thread and box thread divided into three portions with different leads (note that Dearden refers to thread pitch, which is quantified as threads per inch). In FIG. 3B, a graph of the thread leads for the box member and the pin member is shown. As shown in the graph, at one end of the connection, the pin thread lead 21 is larger than the box thread lead 22. In the intermediate portion 23, the pin thread lead 21 and box thread lead 22 are substantially equal. At the other end of the connection, the box thread lead 22 is larger than the pin thread lead 21. In Dearden, the changes in the pin thread lead 21 and box thread lead 22 are step changes (i.e. substantially instantaneous changes in the lead). The varied thread leads disclosed by Dearden are intended to distribute loading across a greater portion of the connection, and have no effect on the inability of the free-running threads to form a thread seal. Dearden does not disclose varying a load lead or stab lead independent of each other.

Figure 3C:
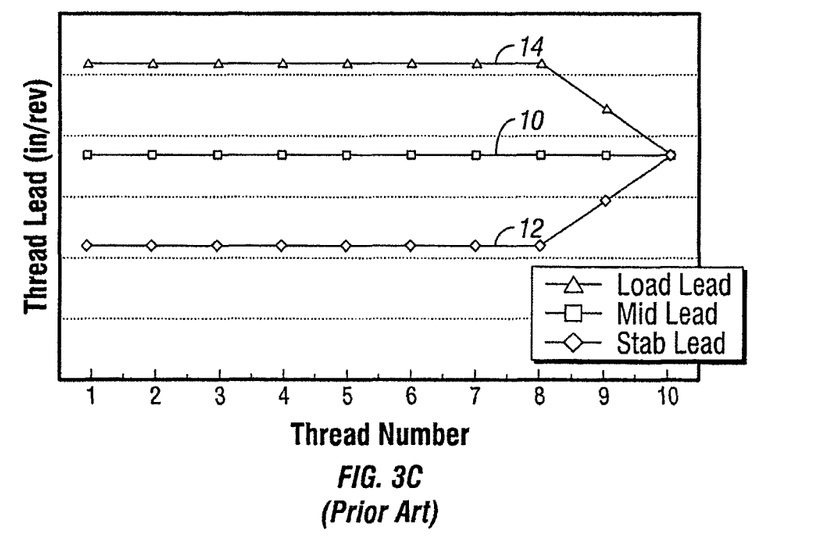

Another connection is disclosed in U.S. Pat. No. 6,976, 711, entitled "Threaded Connection Especially for Radially Plastically Expandable Conduit" ("Sivley"), assigned to the assignee of the present invention, and incorporated herein by reference in its entirety. Sivley discloses connections having a variance in load lead and/or stab lead on one or both of the pin member and the box member. A graph of an embodiment disclosed by Sivley is shown in FIG. 3C. Sivley discloses varying the load lead 14 relative to the stab lead 12 at a selected rate over at least a portion of the pin thread and/or box thread. In FIG. 3C, the connection is a wedge thread as shown by the difference between the load lead 14 and the stab lead 12. The load lead 14 and the stab lead 12 converge at a linear rate towards the end of the thread. Sivley discloses various other embodiments having load leads 14 and stab leads 12 that vary at linear rates relative to each other. The variance in the thread leads distributes the loads experienced by the connection over the length of the connection.

In the prior art, free-running threads suitable for oilfield tubulars fail to provide thread seals suitable for the pressure differentials experienced by the tubulars in the downhole environment. Wedge threads provide thread seals, but have difficulty sealing gases, which are more difficult to seal than fluids. Also, any improvement in the thread seal is generally desirable. What is still needed is a thread seal for free-running threads and an improved thread seal for wedge threads.

SUMMARY OF INVENTION

In one aspect, embodiments disclosed herein relate to a threaded connection including a pin member and a box member. The pin member has a pin thread with a pin thread crest, a pin thread root, a pin load flank, and a pin stab flank. The box member has a box thread with a box thread crest, a box thread root, a box load flank, and a box stab flank. At least one of the pin thread crest, the pin load flank, the pin stab flank, the box thread crest, the box load flank, and the box stab flank has at least one perturbation formed thereon. Upon a selected make-up of the pin member with the box member, a reduced clearance gap exists between the pin thread and the box thread at the at least one perturbation.

In another aspect, embodiments disclosed herein relate to a method of forming a thread seal on a connection. The connection includes a pin member and a box member, wherein the pin member includes a pin thread having a pin thread crest, a pin thread root, a pin load flank, and a pin stab flank and the box member includes a box thread having a box thread crest, a box thread root, a box load flank, and a box stab flank. The method includes forming at least one perturbation on at least one of the pin thread crest, the pin load flank, the pin stab flank, the box thread crest, the box load flank, and the box stab flank such that upon a selected make-up of the pin member with the box member, a reduced clearance gap exists between the pin thread and the box thread at the at least perturbation.

In yet another aspect, embodiments disclosed herein relate to a method to manufacture a threaded connection having a box thread and a pin thread. The method may include a) forming at least one perturbation on at least one of a pin thread crest, a pin load flank, a pin stab flank, a box load flank, and a box stab flank, and b) reducing a clearance gap between the pin thread and the box thread at a location of the at least one perturbation.

Other aspects and advantages of the invention will be apparent from the following description and the appended claims.

DETAILED DESCRIPTION

Embodiments disclosed herein relate to threads for tubulars. More specifically, embodiments relate to threads having a reduced clearance gap between portions of the pin thread and the box thread.

For the purpose of clarity, several terms are explicitly defined below. As used herein, "thread lead" refers generally to the group of leads consisting of the load lead, the stab lead, and the nominal lead.

As used herein, "perturbation" refers to a deviation in an original path of the load flank, the stab flank, the root, or the crest on the thread such that a bump is formed thereon. After the perturbation, the path returns at least partially towards the original path prior to the perturbation.

As used herein, "helical length" refers to the number of turns of the thread that the contactor is disposed, and may be expressed in the number of degrees about the axis of the tubular (i.e. 360 degrees is one thread pitch).

Embodiments disclosed herein have variations in at least one thread lead over at least a portion of a thread such that contact pressure between mating load flanks and/or mating stab flanks varies. Some embodiments may also vary the height of a thread (as measured from root to crest) in order to form a thread seal. Increases in contact pressure increases the maximum sealing pressure that may be achieved by the thread seal at the location of the perturbation. Decreases in contact pressure may be used to provide locations for an increased amount of thread lubricant to remain between the pin thread and the box thread after make-up of the connection.

Figure 4A:
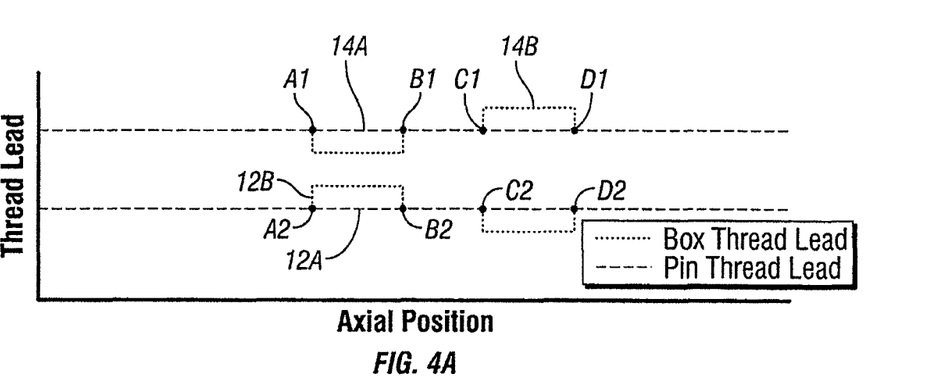
FIG. 4A shows a graph of thread leads in accordance with one embodiment disclosed herein.
Figure 4B:
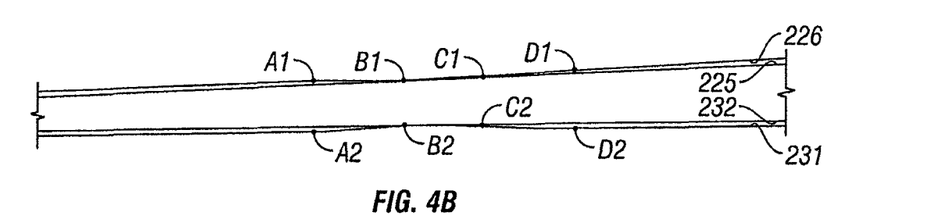
FIG. 4B shows a portion of unwrapped threads corresponding with the graph shown in FIG. 4A.

Turning to FIG. 4A, a graph of thread leads versus axial position in accordance with one embodiment disclosed herein is shown. FIG. 4B shows an unwrapped wedge thread corresponding to the graph in FIG. 4A. The graph in FIG. 4A shows the box load lead 14B and box stab lead 12B relative to pin load lead 14A and pin stab lead 12A. In this embodiment, the pin thread has a substantially constant load lead 14A and stab lead 12A over the illustrated portion, while the box thread has perturbations caused by variances in the load lead 14B and stab lead 12B. Those having ordinary skill in the art will appreciate that, in another embodiment, the perturbations may instead be located on the pin thread.

In FIG. 4A, a perturbation of the box thread begins at points A1 and A2 where the box load lead 14B decreases and the box stab lead 12B increases. The corresponding change in the shape of the thread is shown in FIG. 4B. At points A1 and A2, the box load flank 226 and box stab flank 231 begin to "pinch" the pin thread. At points B1 and B2, the box load lead 14B and the box stab lead 12B return to the original values. This continues for a selected helical length resulting in a portion of the box thread and pin thread at which increased contact pressure exists when the connection is made-up. At points C1 and C2, the box load lead 14B increases and the box stab lead 12B decreases.

Between points C1, C2 and points D1, D2, the box load flank 226 and the box stab flank 231 substantially return to the original path prior to the start of the perturbation. In one embodiment one or both of the box load flank 226 and the box stab flank 231 may not return fully to the original path. Further, in one embodiment, the maximum value and the minimum value in thread lead changes may not be equal in magnitude. For example, a thread lead may increase by "x" over the original thread lead for a helical length "L." To return to the original path, the same thread lead may decrease by ½*x under the original thread lead for a helical length 2L. Those having ordinary skill in the art will appreciate that numerous variations of perturbations may be derived without departing from the scope of the present invention. In one embodiment, the perturbation may have a helical length that is less than about 360 degrees. In another embodiment, the perturbation may have a helical length that is less than about 180 degrees.

FIGS. 4A and 4B provide an exaggerated example of a thread perturbation for illustrative purposes. The wedge thread in FIG. 4B is partially made-up such that the only point of contact between the load flanks 225 and 226 and the stab flanks 231 and 232 is at the perturbation between points B1, B2 and points C1, C2. The gap between the load flanks 225 and 226 and the stab flanks 231 and 232 is exaggerated to be visible in FIG. 4B. In one embodiment, the change in the thread lead and the helical length at which it continues may be selected such that the perturbation is between about 0.0005 inch and about 0.005 inch in size. In another embodiment, the perturbation may be between about 0.001 inch and about 0.002 inch in size. As the connection in FIG. 4B is made-up past the initial contact at the perturbation, the gap between the load flanks 225 and 226 and the stab flanks 231 and 232 will disappear as the contact pressure at the perturbations locally deforms the thread. After the connection has been made-up to a desired torque or relative position of the pin member and the box member, greater contact pressure will exist between the load flanks 225 and 226 and the stab flanks 231 and 232 at the perturbations in FIG. 4B between points A1, A2 and points D1, D2 than the remaining portions of the threads.

The helical length of each perturbation may vary as desired, however, the manufacturing method may limit the variability of the helical length. For example, in one embodiment, a computer numerically controlled ("CNC") lathe may be used. CNC machines may be controlled by CNC programs. Typically, the CNC program consists of positions for each axis of control. For example, if the CNC lathe has an axial position and a rotational position, the program would have an axial position value corresponding with each rotational position. Because a CNC lathe is usually rotating at a set speed measured in rotations per minute ("RPM"), the CNC program typically has the rotational positions in order and at set increments as the part is rotated in the machine. The increments at which the rotational positions are spaced is commonly referred to as the "resolution" of the lathe.

For example, if the resolution is about 90 degrees, a data point will exist for each sequential increment of about 90 degrees. An axial position would be selected for each increment. Typically, the CNC lathe will move the axial position at a substantially constant speed between points. The speed is selected as required to reach the next axial position at substantially the same time as the corresponding rotational position. The thread lead can be selected by calculating the value for the increments such that for each revolution, the axial position advances by a distance substantially equal to the thread lead. For example, a lead of 1 inch per revolution would advance by a ¼ inch every 90 degrees. Those having ordinary skill in the art will be able to apply the above teachings for use with other manufacturing methods. For example, a CNC mill having 4 axes of control (X, Y, Z, and rotational) may be used.

The resolution of the machine used may limit the minimum helical length of a perturbation. Continuing with the 90 degree example, the minimum perturbation would be about 180 degrees (90 degrees of increased lead, 90 degrees of decreased lead). If the maximum contact pressure is desired over an extended length (similar to FIGS. 4A and 4B), then the minimum helical length of the perturbation would be about 270 degrees (90 degrees increased lead, 90 degrees at original lead, 90 degrees at decreased lead). Higher resolution (i.e. smaller rotational increments) allows for greater variability in the helical length of the perturbation. Those having ordinary skill in the art will appreciate that machines with higher or lower resolution may be used to form the perturbations without departing from the scope of the present invention.

Figures 5A, 5B:
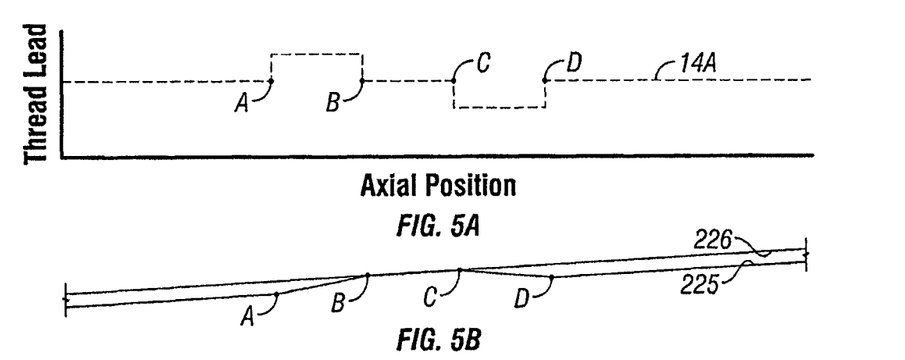
FIG. 5A shows a graph of a thread lead in accordance with one embodiment disclosed herein.
FIGS. 5B and 5C show a portion of unwrapped threads corresponding with the graph shown in FIG. 5A.
Figure 5C:
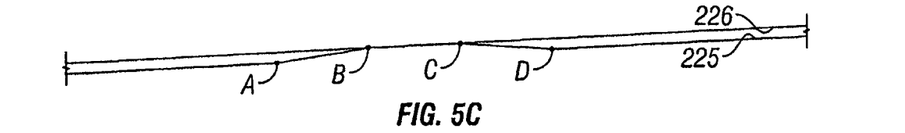

The manufacturing method used, and in particular the specific machine, to form the threads with perturbations will affect the actual shape and size of the perturbations. FIG. 5A shows a graph of a pin load lead 14A relative to axial position in accordance with one embodiment disclosed herein. FIG. 5B shows the idealized shape of the perturbation corresponding to the graph in FIG. 5A, while FIG. 5C shows what may be the actual shape of the perturbation as a result of the machine used. In FIG. 5A, the pin load lead 14A increases by a selected amount at point A to achieve increased contact pressure between the pin load flank 225 and the box load flank 226. Then, the pin load lead 14A returns to the original pin load lead 14A at point B. At point C, the pin load lead 14A decreases by about the same amount as the previous increase to return the pin load flank 225 to about its original path at point D. Ideally, the pin load flank 225 corresponding to the graph of the pin load lead 14A in FIG. 5A would be substantially as shown in FIG. 5B. In FIG. 5B, the pin load flank 225 changes instantaneously at point A and at a constant linear slope (about equal to the change in pin load lead 14A shown in FIG. 5A) until point B. Then at point C, the pin load flank 225 begins to return to its original path until point D. Momentum of the moving parts and response time in the controls may result in a more smoothed out perturbation as shown in FIG. 5C. In some embodiments, the curvature may be substantially sinusoidal. Although the precise shape of the perturbation may vary by production method, the benefits of the increased contact pressure may still be realized.

In one embodiment, a perturbation may be formed during the finishing pass ("skim cut") of the thread. As used herein, a skim cut refers to a cut on a thread subsequent to a first cut. Typically, a skim cut removes 0.020 inches or less of material. Because less material is removed during the skim cut, higher machining tolerances for the size of the perturbation may be achieved. It should be noted, however, that the machined perturbation may be smaller in size than what was coded into the CNC program. This is largely due to push-off of the machine tool from the thread while cutting. As a result, if a 0.002 inch perturbation is coded into the CNC program, the actual perturbation may be only 0.00075 inch. Those having ordinary skill in the art will appreciate that the characteristics of the particular machine will result in variances between the perturbation that is input and the resulting perturbation size. This discrepancy may be corrected for a selected machine by increasing the size of the input perturbations to result in the desired perturbation size when the accuracy of the selected machine is known.

Figure 6A:
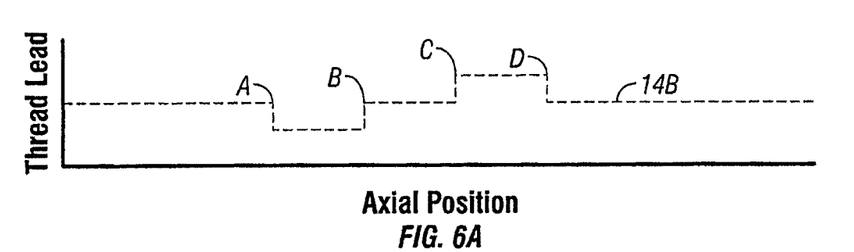
FIG. 6A shows a graph of a thread lead in accordance with one embodiment disclosed herein.
Figure 6B:
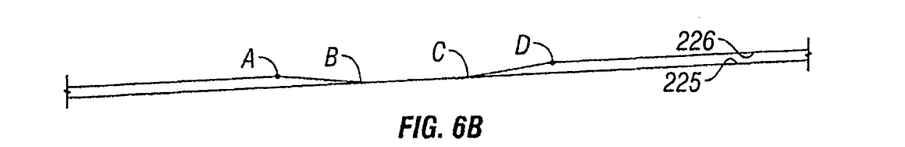
FIG. 6B shows a portion of unwrapped threads corresponding with the graph shown in FIG. 6A.

Turning to FIG. 6A, a graph of a box load lead 14B relative to axial position is shown in accordance with one embodiment disclosed herein. FIG. 6B shows the corresponding box load flank 226. In FIG. 6B, the shape of the perturbation is slightly curved as a result of the machine used to form the thread. To achieve increased contact pressure between the pin load flank 225 and the box load flank 226, the box load lead 14B decreases at point A. Note that this is the inverse of FIG. 5A, which changed the pin load lead 14A to form the perturbation. Viewing FIGS. 5A and 6A relative to each other shows that either the pin thread or box thread may have a perturbation to achieve and increased contact pressure at a selected location on the threads. Reducing the box load lead 14B achieves substantially the same result as increasing the pin load lead 14A. As shown in FIG. 4A, the change in stab leads 12A and 12B is the inverse of the load leads 14A and 14B. For example, to have perturbations on the pin load flank 225 and the pin stab flank 232 in one embodiment, the pin load lead 14A may increase and the pin stab lead 12A may decrease at about the same axial position. Essentially, the pin thread would widen causing increased contact pressure between the neighboring box thread. To have substantially the same effect by having perturbations on the box member, the box load lead 14B may decrease and the box stab lead 12 may decrease as shown in FIG. 4A.

Figure 7A:
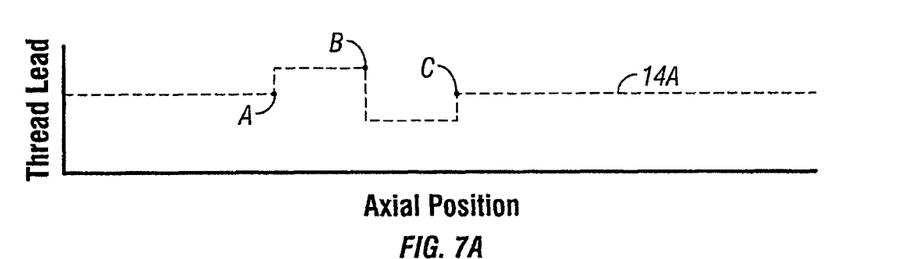
FIG. 7A shows a graph of a thread lead in accordance with one embodiment disclosed herein.
Figure 7B:
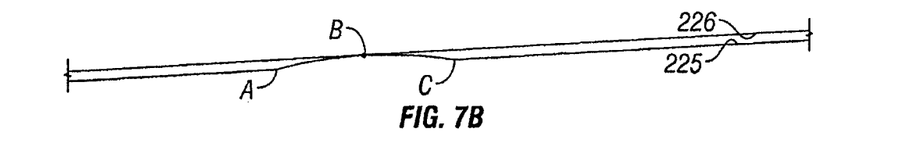
FIG. 7B shows a portion of unwrapped threads corresponding with the graph shown in FIG. 7A.

In FIGS. 7A and 7B, a perturbation in accordance with one embodiment disclosed herein is shown. FIG. 7A shows a graph of the pin load lead 14A, and FIG. 7B shows the corresponding perturbation on the pin load flank 225. In this embodiment, the pin load lead 14A increases at point A by a selected amount. At point B, the pin load lead 14A decreases by about the same selected amount below the original pin load lead 14A. The perturbation ends at point C where the pin load flank 225 returns to about its original path. The corresponding perturbation shown in FIG. 7B resembles a rounded bump.

Figure 8:
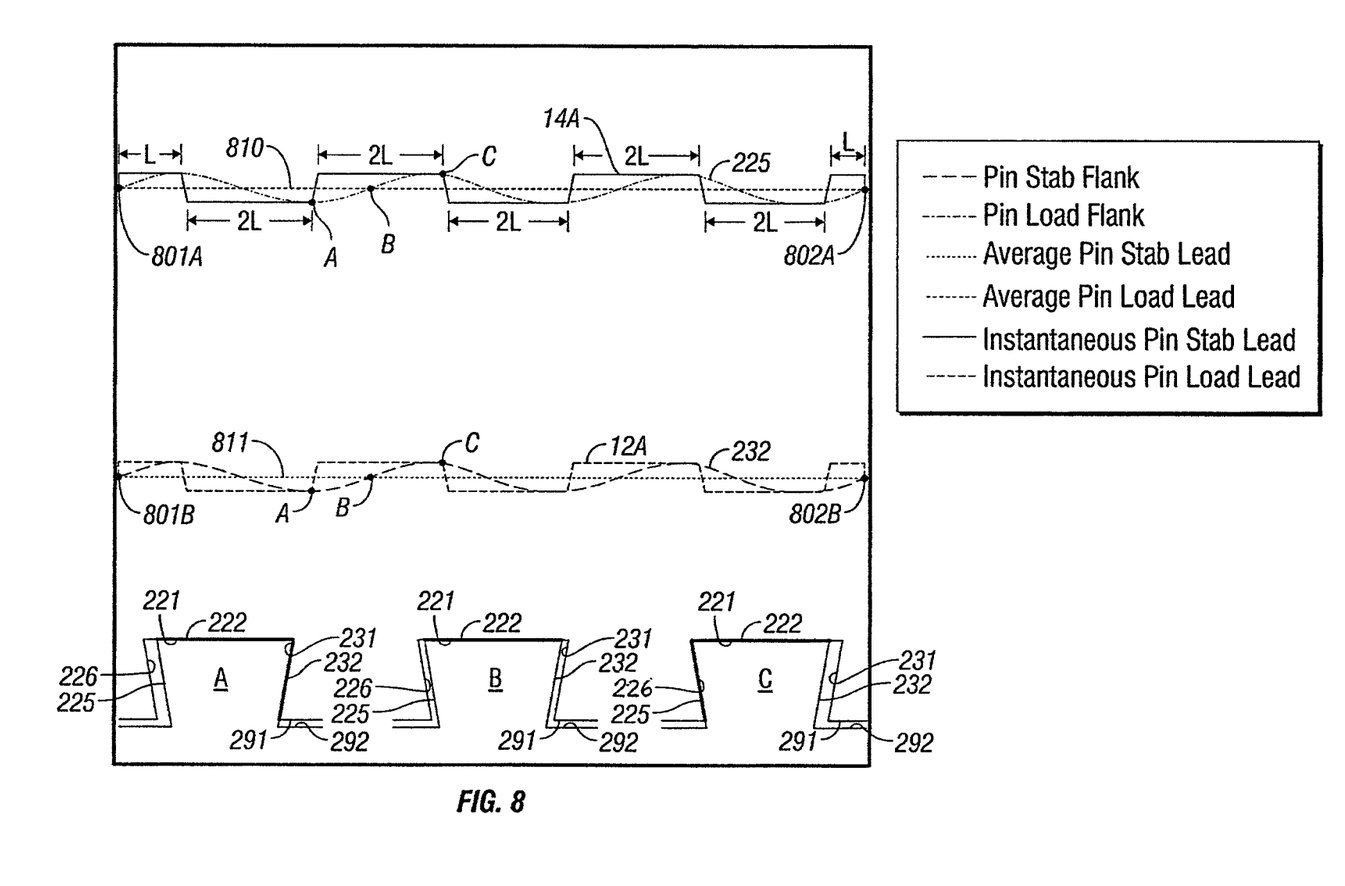
FIG. 8 shows a graph of thread leads with corresponding cross sections of threads in accordance with one embodiment disclosed herein.

Turning to FIG. 8, multiple perturbations in accordance with one embodiment disclosed herein are shown. FIG. 8 includes a graph of the pin load lead 14A and the pin stab lead 12A. The embodiment shown in FIG. 8 may be referred to as "induced thread drunkenness" because it resembles the wobbling effect of machining as discussed above. Thread drunkenness may be "induced" by programming thread lead changes into the CNC program. In FIG. 8, the induced thread drunkenness begins at points 801A and 801B where both the pin load lead 14A (termed as "instantaneous pin load lead" in this embodiment) and the pin stab lead 12A (termed as "instantaneous box load lead" in this embodiment) begin to vary upward and downward, which results in a rippled pin load flank 225 and pin stab flank 232. To have even positive and negative drunkenness, the initial increase in pin load lead 14A and pin stab lead 12A may have a helical length of L, then the subsequent decrease in pin load lead 14A and pin stab lead 12A may have a helical length of 2L such that the pin load flank 225 and pin stab flank 232 cross their original paths. To return to the original paths at point 802A and 802B, the total increases in pin load lead 14A and pin stab lead 12A multiplied by the helical lengths of the heightened thread leads should substantially equal the total decreases in pin load lead 14A and pin stab lead 12A multiplied by the helical lengths.

For example, in FIG. 8, the pin load lead 14A and pin stab lead 12A are less than the average pin load lead 810 and the average pin stab lead 811, respectively, for a total of 5L in helical length. The pin load flank 225 and pin stab flank 232 return to their original paths at points 802A and 802B after the pin load lead 14A and pin stab lead 12A have been above the average pin load lead 810 and the average pin stab lead 811, respectively, for a total of 5L in helical length. Those having ordinary skill in the art will appreciate that the helical lengths may not need to be equivalent if at any point the absolute values of decreases or increases in the pin load lead 14A and pin stab lead 12A are not equal. For example, in one embodiment, increases in the pin load lead 14A may be about 0.002 inch per revolution above the average pin load lead 810, and decreases in the pin load lead 14A may be about 0.001 inch per revolution below the average pin load lead 810. In that embodiment, the helical length of decreases in the pin load lead 14A may be about twice as much as the helical length of increases in the pin load lead 14A to return to the original path of the pin load flank 225. In other words, some embodiments may vary asymmetrically from nominal. Those having ordinary skill in the art will appreciate that the increases and decreases in the thread leads, as well as their respective helical lengths, may vary without departing from the scope of the present invention. Further, embodiments may have perturbations that do not fully return to their original paths.

Continuing with FIG. 8, cross sections of threads corresponding to the graph are shown. The cross sections are labeled A, B, and C, which corresponds to points A, B, and C on the graph. The wedge thread in FIG. 4B is partially made-up such that the only point of contact between the load flanks 225 and 226 and the stab flanks 231 and 232 is at the perturbations. In this particular embodiment, the positive and negative perturbations are equal in absolute value such that contact occurs at each maximum and minimum of the perturbations at substantially the same make-up position. This contact is shown in cross sections A and C, which are at a local minimum and local maximum, respectively. At the local minimums of the perturbations (cross section A), the stab flanks 231 and 232 are in contact. At the local maximums of the perturbations (cross section C), the load flanks 225 and 226 are in contact. At the average pin load lead 810 and average pin load lead 811 (i.e. original paths), the gaps between the load flanks 225 and 226 and the stab flanks 231 and 232 may be substantially equal, which is shown in cross section B.

As the connection in FIG. 8 is made-up past the initial contact at the perturbations, the gap between the load flanks 225 and 226 and the stab flanks 231 and 232 will disappear as the contact pressure at the perturbations locally deform the thread. After the connection has been made-up to a desired torque or relative position of the pin member and the box member, greater contact pressure will exist between the load flanks 225 and 226 and the stab flanks 231 and 232 at the maximums and minimums of the perturbations than the remaining portions of the threads. Also, as previously discussed, the gap between the roots 292 and 221 and crests 291 and 222, respectively, will also decrease or close completely when the connection is made-up.

Figure 9:
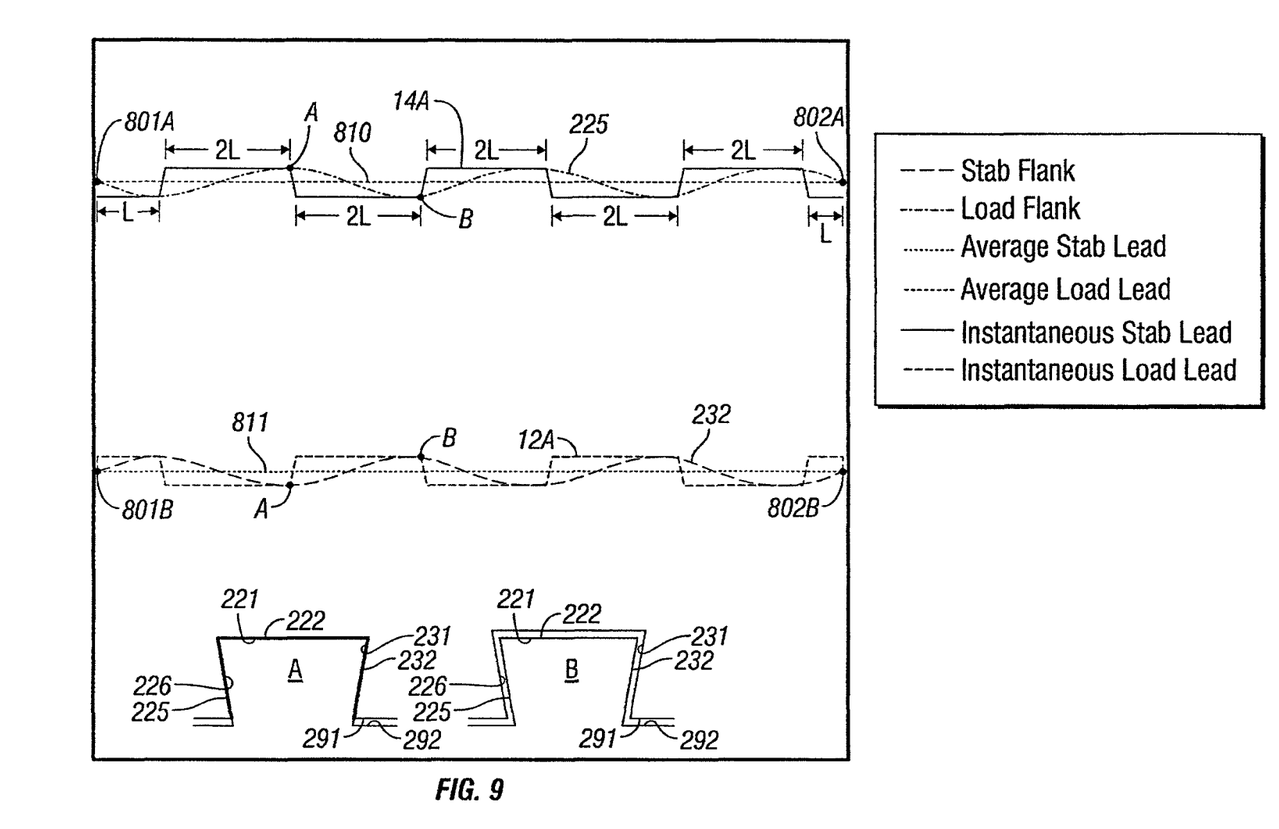
FIG. 9 shows a graph of thread leads with corresponding cross sections of threads in accordance with one embodiment disclosed herein.

Turning to FIG. 9, multiple perturbations in accordance with one embodiment disclosed herein are shown. FIG. 9 includes a graph of the pin load lead 14A and the pin stab lead 12A. The embodiment shown in FIG. 9 is similar to the "induced thread drunkenness" shown in FIG. 8, except that the pin load lead 14A and the pin stab lead 12A do not increase and decrease in unison. Instead, the pin load lead 14A and the pin stab lead 12A increase and decrease at opposing locations such that the pin thread widens and narrows with each of the perturbations. In other words, in this embodiment, the pin load lead 14A is greater than the average load lead 810 at substantially the same locations where the pin stab lead 12A is less than the average stab lead 811. An increase in the pin load lead 14A combined with a decrease in the pin stab lead 12A widens the thread (see cross section A), while a decrease in the pin load lead 14A combined with an increase in the pin stab lead 12A narrows the thread (see cross section B). During make-up of the connection, contact between the flanks would occur at the increased width portions as shown in cross section A. When the contact occurs at the wider portions, gaps between the flanks would still exist in the narrower portions as shown in cross section B. Upon selected make-up of the connection, substantially all of the gaps between the flanks will disappear, and the connection will have increased contact pressure between the flanks at the wider portions.

Figure 10:
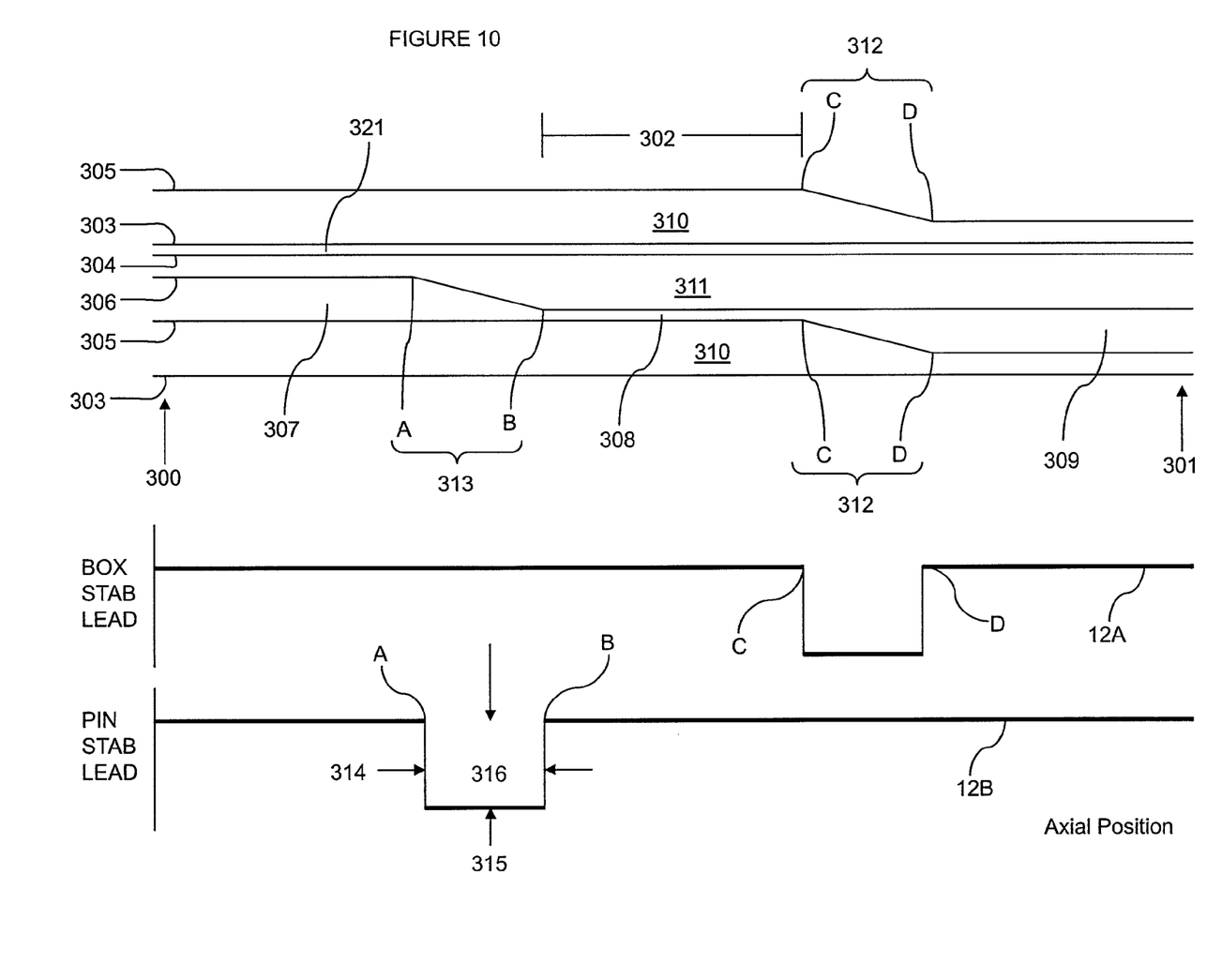
FIG. 10 shows a graph of thread leads with corresponding cross sections of threads in accordance with one embodiment disclosed herein.

Referring now to FIG. 10, multiple perturbations in accordance with one embodiment disclosed herein are shown on a free-running thread. FIG. 10 schematically represents a box thread 310 and a pin thread 311 at make-up. As such, pin thread 311 includes a stab flank 306, a load flank 304, and a pin nose end 300. Similarly, box thread 310 includes a stab flank 305, a load flank 303, and a box face end 301. Note that box thread 310 is shown twice, on either side of the pin thread 311, to better illustrate the clearance between both stab and load flanks (305 & 306; 303 & 304) of pin thread 311 and box thread 310.

Free running threads may have many different thread-forms, including vee-type threads, buttress threads, and hooked threads. Embodiments disclosed herein are useful on all types of free-running threads, but are particularly advantageous when used on a hooked-thread connection having at least one radial metal-to-metal seal. Radial metal-to-metal seals are typically located at the distal ends of the connection, that is, at the pin nose (to seal internal pressure) (such as shown in FIG. 2 and described above regarding the interface of contact surfaces 151, 152), or at the box face (to seal external pressure) (such as shown in FIG. 2, and described above, between box face 163 and a mating shoulder (not shown)). Under compressive axial loading, hooked-thread connections can create radial force vectors (due to the negative flank angles of the hooked threads) which reduce the preload on radial metal-to-metal seals, causing the seals to leak. It is desirable, therefore, to reduce the radial force vectors due to compressive loading in the region of the radial metal-to-metal seals.

It may also be desirable to reduce the stab flank clearance (shown as gap 153 in FIG. 2 and described above) in order that the connection may carry compressive loads without undue relative axial movement between pin and box, as this may also unload a metal-to-metal seal. However, reducing the stab flank clearance in the region of a radial seal tends to exacerbate the problem of radial seals leaking under a compressive load, particularly because one of the members (box or pin) is always thinnest at the distal ends where the radial seals are usually located, and will easily deform under a radial force vector. Consequently, it may be especially desirable to have larger stab flank clearance at the distal ends of a hooked-thread connection with radial metal-to-metal seals, while reducing the stab flank clearance in the middle of the thread helix.

Referring still to FIG. 10, the made-up connection includes a mid-thread section 302, between a point B on pin stab flank 306 and a point C on the box stab flank 305. Although mid-thread section 302 is shown located roughly equidistant from pin nose end 300 and box face end 301, and with a typical length of roughly one-third to one-half of the helical length of the thread from pin nose end 300 to box face end 301, one of ordinary skill would understand that other configurations are within the scope of the present disclosure.

As shown, load flanks 303 and 304 have constant leads, while stab flanks 305 and 306 contain perturbations 312 and 313. Furthermore, FIG. 10 shows the axial positions of pin stab flank lead 12A and box stab flank lead 12B in graphical form. In this embodiment, the pin stab flank perturbation 313 is located at the pin nose end of the mid-thread section 302, while the box stab flank perturbation 312 is located at the box face end of the mid-thread section 302.

In the made-up condition as shown, the box load flank 303 and the pin load flank 304 are in contact at the load flank interface 321 as is typical for free-running threads with at least one positive-stop torque shoulder; note that that a gap is shown at the load flank interface 321 only for clarity.

In contrast, conventional free-running threads will have a clearance gap between the stab flanks at make-up. This stab clearance gap is typically in the range of 0.005 inches to 0.015 inches wide, and may extend over the entire length of the thread. In embodiments of the present disclosure, there may be three distinct stab flank clearance gaps at 307, 308, and 309. Pin nose clearance gap 307 is formed at make-up between pin thread 311 and box thread 310 near pin nose 300. Box face clearance gap 309 is formed at make-up between box thread 310 and pin thread 311 near box face 301. Mid-thread clearance gap 308 is formed at make-up between perturbations 312, 313, and may be smaller than clearance gaps 307 and 309. As shown, clearance gaps 307 and 309 may be conventional stab flank clearance gaps of 0.012 inches, while the mid-thread stab flank clearance gap 308 may be about 0.003 inches. Alternatively, clearance gap 308 may be about 0.002 inches. Those skilled in the art will recognize that clearance gaps 307 and 309 may be different from one another according the configuration of the perturbations 312 and 313.

Embodiments in accordance with the present disclosure may have the advantage that, during make-up, a reduced mid-thread stab flank clearance may be formed only near the end of the make-up process, thus minimizing the risk of thread galling during make-up. Furthermore, in some embodiments, a reduced clearance gap between either the load flanks, the stab flanks, or the roots and crests of threads may assist in the formation of a thread seal.

While the presence of a clearance gap may allow some high-temperature and high-pressure fluids to pass therethrough, the perturbed reduced clearance gap may allow a threading compound or sealant to form a seal with more integrity. Particularly, a one or two-part curable epoxy compound may be applied to the threads before make-up and cured to form a thread seal between two threaded members. Therefore, the reduced clearance gap may allow the cured thread compound to experience significantly reduced stress than a cured compound in a larger gap. It should be understood that the curing of the thread compound may occur either before or after the tubular connection is deployed downhole. Particularly, in one embodiment, a thread compound may be designed such that curing only occurs after the connection is downhole for a particular time at a particular temperature. Examples of curable thread sealants and thread compounds may be obtained from Master Bond, Inc. in Hackensack, N.J., as well as numerous other sources known to those having ordinary skill in the art.

The change in the stab flank clearance gaps may be determined by the graphs of the stab flank leads, 12A and 12B. The change between pin nose clearance gap 307 and mid-thread clearance gap 308 is equal to the area of the perturbation on the pin stab flank lead chart 12B. As shown, perturbation area 316 is generally equal to the perturbation length 314 (typically measured in thread pitches) multiplied by the perturbation change in lead 315 (typically measured in inches per pitch). If, for example, perturbation length 314 is one-half of a pitch and the perturbation change in lead is 0.018 inches per pitch, the change in clearance gap between pin nose clearance gap 307 and mid-thread clearance gap 308 will be: 0.5 pitches×0.018 inches/pitch=0.009 inches.

Embodiments of the present invention may also have variable thread heights (i.e., perturbations on a root and/or a crest) on the pin member and/or the box member. The embodiment shown in FIG. 9 includes a variance in the pin thread height. In that particular embodiment, the pin thread height increases at about the same locations as increases in the pin thread width causing interference between the box thread root 221 and the pin thread crease 222, as shown in cross section A when compared to cross section B.

Variations in root/crest interference may be particularly useful for embodiments having free-running threads. As discussed above with respect to FIG. 2, for free-running threads to have a thread seal similar to wedge threads, prior art connections with cylindrical free-running threads would require interference between the load flanks 154 and 155 and stab flanks 157 and 158. That interference would exist substantially throughout the make-up of the connection because the pin thread and the box thread have a continuous width. Further, root/crest interference, if any, would exist substantially throughout the make-up of the connection. This could lead to galling of the threads and difficulty in making up the connection.

In one embodiment, one or both of the pin member and the box member may have free-running threads with perturbations on a load flank, a stab flank, a root, and/or a crest. Preferably, the perturbations may be located such that, at one or more locations, a thread seal is formed. This may be accomplished by selecting the size and locations of the perturbations such that load flank interference, stab flank interference, and root/crest interference exist proximate to each other. Thus, free-running threads may be adapted to form threads seals in one or more embodiments. By forming thread seals on only a portion of the free-running threads, the risk of galling is decreased as compared to having the flank interferences and/or root/crest interference exist over the entire connection. Those having ordinary skill in the art will appreciate that a perturbation on a load flank, which is loaded during make-up of the connection, may not be required to form a thread seal because of the high contact pressure inherent in the load flanks of a free-running thread.

Because of indeterminate make-up of wedge threads, it may be more desirable to have all perturbations on either the pin member or the box member. Alternatively, perturbations on the pin member and the box member may be on portions of the thread that would not contact each other (i.e. at sufficiently different axial positions such that the perturbations do not interact). For free-running threads, which typically have a positive stop torque shoulder, it may also be desirable to have perturbations on either the pin member or the box member because the relative position of the pin member and the box member is somewhat indeterminate, although to a lesser extent than wedge threads.

Those having ordinary skill in the art will appreciate that the desired amount of contact pressure created by perturbations may vary based on the pressure to be sealed, the substance to be sealed, and the material used for the connection. As discussed above, a higher contact pressure results in the ability to seal a greater pressure. Further, if gas, which is more difficult to seal than fluid, is to be sealed by the connection, a greater contact pressure may be desired. The material to be used for the connection may limit the maximum allowable contact pressure. For example, a corrosion resistant alloy (CRA) is typically more susceptible to damage from localized stress (such as that resulting from perturbations) than other high strength steels. Those having ordinary skill in the art will be able to select the desired contact pressure in view of the material to be used for the connection. Alternatively, the material may be selected in view of the desired contact pressure.

Embodiments disclosed herein may include one or more stress relief grooves in the roots of the pin thread and/or the box thread. Such stress relief grooves are taught in U.S. Pat. No. 6,050,610 issued to Enderle et al., assigned to the assignee of the present invention, and incorporated herein by reference in its entirety. Enderle discloses stress relief grooves that provide an escape for trapped lubricant during make-up of the connection. Trapped lubricant may result in false torque readings, which can result in improperly made-up connections. Further, trapped lubricant may damage the connection during make-up if pressure build up within the connection occurs. This problem typically occurs in colder environments when the lubricant is more viscous and less able to escape from the connection to relieve pressure build up. It may also be exacerbated if the connection is made-up with a high speed of rotation.

One problem inherent in stress relief grooves in the roots of the pin thread and/or the box thread, which act as a pressure release, is that the stress relief grooves reduce the ability to thread seal on portions of the threads having the thread seal. Because, as disclosed by Enderle, the stress relief groove may be employed over a limited portion of the thread and in any shape, or of varying depths, the remaining portion of the thread can be used to form an internal and external pressure seal (e.g. by forming one or more perturbations on the thread). In such an embodiment, a thread seal would exist where one or more perturbations are appropriately located away from any stress relief groove.

In one embodiment, the perturbations shown in FIGS. 8 and 9 may be used instead of the stress relief grooves disclosed by Enderle. Periodic or induced thread drunkenness as shown in FIGS. 8 and 9 results in small, spaced apart pockets of reduced contact pressure or gaps along the threads. The stress relief grooves disclosed by Enderle largely function by providing an exit for excess thread dope. As an alternative, the spaced apart pockets can provide places for the lubricant to collect in the connection rather than exit the connection. The present inventor believes that the intermittent trapping of the lubricant between perturbations with increased contact pressure can provide an improved thread seal. Further, having trapped lubricant ensures that sufficient lubrication exists in the connection to aid in disconnecting the tubulars after use.

As discussed above, periodic variations from nominal dimensions occur naturally ("natural variations") during the manufacturing process. Although manufacturers take various steps to minimize the natural variations, at least some variation from nominal exists, and is acceptable if it is within a desired tolerance. Because the exact location and extent of the natural variations are unknown during manufacturing, it may be desirable that the size of the perturbations be selected such that benefits are derived despite the location of the perturbations relative to the natural variations. For example, if a particular machining setup (e.g. machine, machine tool, fixtures, material, dimensions of the part) has a typical occurrence of natural variations on the order of about +/−0.001 inch. To ensure that some benefit of the perturbations exist in the connection (rather than being cancelled out by the natural variations), the size of the perturbations may be selected to be about twice (i.e. +/−0.002 inch) the size of the natural variations.

Characteristics of the connection may affect the desired size of the perturbations. Ideally, as a metal-to-metal seal is formed (e.g. a thread seal) the surfaces coming into contact rub for a short distance causing "burnishing" of the surfaces. As used herein, "burnishing" means a slight polishing or smoothing of the surfaces. If the surfaces contact for too great of a length at too great of a contact pressure, galling may occur. Galling occurs when the lubricant is displaced from between the surfaces as sliding contact continues, resulting in an increase in friction and heat build up. To avoid undesirable galling, perturbations should be sized to prevent extended lengths of sliding contact during make-up. To form a thread seal, contact pressure between mating surfaces (e.g. load flanks, stab flanks, and roots and crests) is typically from about 25 percent to about 100 percent of the yield strength of the material. Closed thread forms (e.g. dovetailed threads) generally allow for the contact pressure to be towards the higher end of the range. Ideally, a thread seal is formed by surfaces coming together over a short distance with sharply rising contact pressure ending with the contact pressure within the effect range of forming a thread seal.

The wedge ratio of a wedge thread is a parameter that may affect the desired size of the perturbation. Essentially, the wedge ratio determines how "quickly" (i.e. over how many linear inches the surfaces contact during make-up) the surfaces come into contact. In general, larger wedge ratios allow for larger perturbations than smaller wedge ratios. In one embodiment, the size of the perturbation may be selected to be between about 0.1 and about 0.2 times the wedge ratio. For example, if the wedge ratio (difference between the load lead and the stab lead) is about 0.020 inches, the desired size of the perturbation would be between about 0.002 inch and about 0.004 inch.

Another factor to consider in selecting the size of the perturbation is the material, which can affect the susceptibility to galling. For example, CRA is more prone to galling than carbon steel. Thus, a connection made of CRA (assuming all other parameters are equal) would be more likely to have thread galling than a connection made of carbon steel having the same size perturbation. To prevent galling, the connection made of CRA may have a smaller perturbation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection comprising:
 a pin member comprising a pin thread having a pin thread crest, a pin thread root, a pin load flank, and a pin stab flank;
 a box member comprising a box thread having a box thread crest, a box thread root, a box load flank, and a box stab flank,
 a pin nose clearance gap;
 a box face clearance gap; and
 a mid-thread clearance gap;
 wherein at one end of the mid-thread clearance gap the pin stab flank has a perturbation formed thereon and at another end of the mid-thread clearance gap, the box stab flank has a perturbation formed thereon,
 wherein upon make-up of the pin member with the box member, the mid-thread clearance gap has a smaller clearance gap than either the pin nose clearance gap and the box face clearance gap.

2. The threaded connection of claim 1, wherein the pin thread and the box thread are wedge threads.

3. The threaded connection of claim 1, wherein the pin thread and the box thread are free-running threads.

4. The threaded connection of claim 1, wherein the mid-thread clearance gap is less than 0.005 inches.

5. The threaded connection of claim 1, wherein the mid-thread clearance gap is between about 0.003 and 0.002 inches.

6. The threaded connection of claim 1, further comprising:
 a groove formed in only a portion of at least one of the pin thread root and the box thread root,
 wherein at least one perturbation is selectively located to form a thread seal at a location away from the groove.

7. A method to manufacture a threaded connection comprising a pin thread and a box thread, the method comprising:
 forming a perturbation on a pin stab flank and;
 forming a perturbation on a box stab flank;
 wherein the perturbation on the pin stab flank and the perturbation of the box stab flank together create a mid-thread clearance gap.

8. The method of claim 7, further comprising forming a thread seal at the location of at least one on the perturbation on the pin stab flank and the perturbation on the box stab flank.

9. The method of claim 7, wherein at least one of the perturbation on the pin stab flank and the perturbation on the box stab flank extends over at least one full pitch of at least one of the pin thread and the box thread.

10. The method of claim 7, further comprising reducing the mid-thread clearance gap between the pin thread and the box thread to between about 0.005 and 0.002 inches at the location of at least one perturbation.

11. The method of claim 7, further comprising reducing the mid-thread clearance gap between the pin thread and the box thread to between about 0.003 and 0.002 inches at the location of at least one perturbation.

* * * * *